Sept. 26, 1967 S. W. STRICKMAN 3,343,211
APPARATUS FOR FORMING RING-SHAPED EXTRUDATES
Filed Oct. 12, 1966 7 Sheets-Sheet 1

INVENTOR.
SAMUEL W. STRICKMAN
BY Jacobi & Davidson
ATTORNEYS.

Sept. 26, 1967 S. W. STRICKMAN 3,343,211
APPARATUS FOR FORMING RING-SHAPED EXTRUDATES
Filed Oct. 12, 1966 7 Sheets-Sheet 6

Samuel W. Strickman
INVENTOR
Jacobi & Davidson
BY ATTORNEYS

Sept. 26, 1967  S. W. STRICKMAN  3,343,211
APPARATUS FOR FORMING RING-SHAPED EXTRUDATES
Filed Oct. 12, 1966  7 Sheets-Sheet 7

Samuel W. Strickman
INVENTOR
BY Jacobi & Davidson
ATTORNEYS

United States Patent Office 3,343,211
Patented Sept. 26, 1967

3,343,211
APPARATUS FOR FORMING RING-SHAPED EXTRUDATES
Samuel W. Strickman, Bayside, N.Y., assignor to Rosen and Strickman, Newark, N.J., a co-partnership composed of Jacob J. Rosen and Samuel W. Strickman
Filed Oct. 12, 1966, Ser. No. 586,170
14 Claims. (Cl. 18—5)

ABSTRACT OF THE DISCLOSURE

Apparatus for forming ring-shaped extrudates particularly for use as gaskets in closures. The apparatus includes a dispensing head which is fed from a reservoir of material and which is designed to dispense an annular ring of material and confine such ring to a pre-determined portion of a closure cap. One embodiment includes pressure responsive valves for automatically dispensing individual rings of the material with means to shear the ring from the dispensing head. An alternate embodiment utilizes a pump means for feeding selected quantities of the material to the dispensing head for deposition thereby. Various features are described including venting or pressurized air means for precluding the formation of a vacuum inside the annular extrudate. A flexible lip is provided on portions of the dispensing head engaging the closure and deformable means are provided on the support for the closure to accommodate slight irregularities. Means are shown for separating the dispensing head from the closure surface relatively slowly so as to preclude undesirably disturbing the extrudate during the withdrawal operation.

---

This application is a continuation-in-part of copending application Ser. No. 558,698 filed June 20, 1966 which in turn is a continuation-in-part of application Ser. No. 319,911 filed Oct. 29, 1963, now Patent No. 3,261,895 dated July 19, 1966, the latter application in turn being a continuation-in-part of applications Ser. Nos. 49,659 and 49,655 both filed Aug. 15, 1960, and also applications Ser. Nos. 829,451 and 742,816 filed July 24, 1959, and June 18, 1958, respectively, the last four-mentioned applications now being abandoned.

The present invention relates to apparatus for forming ring-shaped extrudates and relates more particularly to apparatus for depositing an annular ring of a heat-foamable plastisol material or the like as a sealing means in closures such as crown closures, lug closures or screw closures.

Various types of closures are provided with a liner or sealing means to conform to possible irregularities between the lip of the container and the closing surface of the closure whereby the container is tightly sealed to prevent loss of the contents from within and entrance of contaminants from without. Crown closures have generally been provided with a liner of cork having a "spot" of metal foil in the center. Various closures have had liners or pads formed of resinous compounds forming a uniform thickness over the entire top panel of the closure as well as in contact with the depending skirt of the same. In some instances such liners have been provided with thicker annular areas of the same material for engaging the lip of the container. In general, materials having high resistance to penetration would not demand as great a thickness in the center of the closure cap to protect the cap itself from the contents of the container as would be necessary at the periphery of the cap to provide the sealing function. In many instances such as with lug or with screw caps, it is possible to delete the center portion of the liner entirely and provide merely a pheripheral sealing gasket.

The art has heretofore employed elastomeric or plastic materials of varying description, including plastisols of polyvinylchlorides, in the search to find more economically feasible materials for preparing the liner and/or seal having the hereinbefore mentioned characteristics. Foamable as well as non-foamable plastisols of polyvinylchloride have been heretofore employed. As their use has heretofore generally required some form of shaping of the surface of the liner to impart the desired liner characteristics mentioned above, the central portion covering the area to come in contact with the container's content and the thicker annular sealing portion are of the same material. The use of heretofore known foamable plastisols as liner materials in crown type closures has been curtailed because existing blowing agents prepare foams unsuitable for such use because residues therein are readily extractable by the container content and are toxic or off-flavor imparting or because such known blowing agents require techniques of application which are not readily amenable to limiting the foamed material in its contact with the container's content.

Prior known techniques for forming liners in closures employing such materials are generally characterized either (1) by employing a heated plunger and/ or a cold plunger with a heated cap to form or shape the polymeric material to the desired surface characteristics of the liner and/or seal during some period of the required fluxing and/or curing steps, (2) by using centrifugal force to position the plastisol deposited as a glob in the interior upper surface to the desired surface characteristics by spinning the cap at relatively high speeds, or (3) by depositing a ribbon of the plastisol adjacent to the depending skirt portion of the closure from a point discharge outlet while the cap is rotated. Such prior art approaches are accompanied by a number of serious draw-backs. The use of a plunger to form the pad or liner of desired configuration requires expensive and complicated apparatus as the tolerances required of such plungers are relatively critical and it is necessary to contact the plunger with the plastisol during some period of the required curing steps thereby severely limiting the rate at which the caps can be produced. The known spinning techniques are limited in the rate of production and control of the distribution of the plastisol is difficult at best and the depending skirt is inadvertently and unevenly coated with plastisol and/or the thickness of the resulting gasket is subject to considerable variation. Moreover, the seals prepared by such methods require a relatively large quantity of plastisol with concomitant high rate of cost.

Accordingly, it is one feature of the present invention to provide apparatus for forming closure seals requiring a substantially lesser quantity of material to form than the liners employed in similar closures heretofore known.

A further feature of the invention is the provision of apparatus for forming closure seals having a relatively thick annular portion of vinyl foam disposed peripherally about the inside surface of a shell. In some instances, such as for crown closures, the ring of foam can extend from the skirt of the shell to the adjacent portion of the center panel whereby a major portion of the foam is adapted to surround the outside of the container mouth with only a flattened edge portion of the foam in sealing engagement with the top sealing edge of the container mouth. Alternately, as with lug or screw caps the ring of foam may be spaced inwardly of the skirt so as to form an inside and an outside seal with the container as well as a top seal, the material cold flowing around the container edge in use. In any event, depositing a ring of material permits use of the seal only where necessary thereby decreasing costs of material.

Reference may be had to parent application Ser. No. 319,911, mentioned hereinabove, copending application Ser. No. 511,206, filed Dec. 2, 1965, entitled Resinous Compositions and Methods of Making and Foaming the Same, and copending application Ser. No. 558,697, filed on June 20, 1966, entitled Container Closures, for further details of the types of materials utilized and products produced with the apparatus of this invention.

Another feature of the invention is the provision of an extrusion means having an annular shaped discharge outlet for depositing, at ambient temperatures and pressures, in the inner surface of a closure, a ring-shaped extrudate of heat foamable plastisol which, in the case of certain applications, may take the form in cross section of a quadrant having its arcuate surface extending between the top panel and depending skirt of the closure confined to a predetermined area of the inner surface by a die element cooperating with the annular shaped outlet so that the heat foamable plastisol can be foamed and cured at ambient pressures avoiding the use of a shaping plunger to form or shape the surface of the liner during the curing steps and enabling the application to the inner surface of the top panel of one material having outstanding characteristics for assuring against contact thereof with the contents of the container and the application of a different material having outstanding resealable properties to the limited area of the inner surface of the closure for engaging the lip of the container.

Another feature of this invention is to provide apparatus which will deposit viscous gasket forming material on the inner surface of a closure cap in a rapid manner as a charge of uniformly continuous, annular-shaped configuration being positioned in the closure in juxtaposition or in contact with the skirt of the closure.

Further features and advantages of the present invention will become apparent from the more detailed description thereof as hereinafter set forth and the illustrative practice of the invention shown in the accompanying drawings in which:

Like reference numerals refer to like parts throughout the several views of the drawings.

It is to be understood that although certain of the embodiments are shown as utilized in the production of crown-type caps while others are shown as utilized in the production of lug or screw-type closures, each of the embodiments will be equally applicable to any form of closure means although certain features in the various embodiments will be particularly adapted for a specific type of closure.

Referring to the drawings, and more particularly to FIGURES 1–4, one form of apparatus according to this invention comprises a reservoir 10 supported by suitable supporting structure 12 on a base 14. The reservoir 10 is adapted to contain a viscous gasket-forming substance 16. A conduit 18 leads from the reservoir 10 to a source of compressed gas (not shown). A valve 20 is located in conduit 18 to regulate the flow of compressed gas to the reservoir 10. If desired, the reservoir 10 can be provided with an automatic feed and level-maintaining device (not shown).

A flexible conduit 22, preferably of metal, leads from the reservoir 10 to the dispensing device shown generally at 24. A pressure-sensitive ball check valve 26 is located in conduit 22, preferably adjacent the dispensing device 24. The ball check valve 26 may be of any well-known type adapted to open in response to pressure exerted thereon by material leaving the reservoir 10 and close in response to pressure exerted thereon by material in the dispensing device 24.

Figure 2:
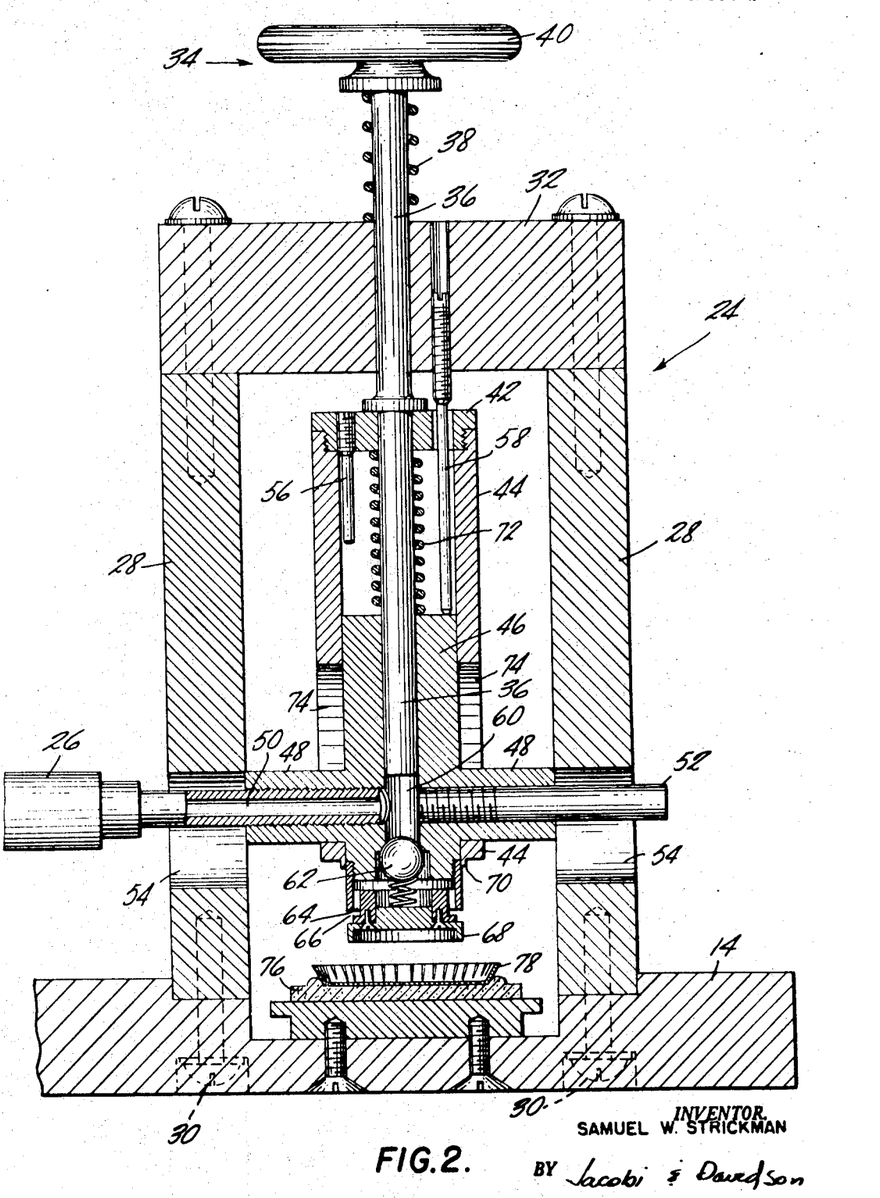
FIGURE 2 is a cross sectional side view of the dispenser used shown as part of the apparatus in FIGURE 1.

The dispensing device 24, as shown particularly in FIGURE 2, comprises an inverted U-shaped support having upright members 28 which are fastened to the base 14 by means of appropriate bolts 30. A transverse member 32 joins the upright members 28.

A dispensing unit 34 is provided, having a shaft 36 journalled for vertical, reciprocal movement in the transverse member 32. The dispensing unit 34 is biased upwardly in an open position by means of a spring 38 interposed between the top of transverse member 32 and a handle 40 of the dispensing unit 34.

A yoke 42 is attached to the shaft 36 at a point below the transverse member 32. The yoke 42 supports an outer sleeve or shearing element 44. Intermediate the shaft 36 and the outer sleeve 44 is an inner, independently reciprocating element 46, said element 46 being journalled on shaft 36 for vertical movement relative thereto. Projections 48 form a part of element 46 and encase the conduit 50 and a guide bar 52. By extending to both inner surfaces of support members 28, projections 48 serve to maintain the shaft 36 and the element 46 in a predetermined path during vertical movement thereof. As shown in FIGURE 2, conduit 50 and guide bar 52 extend beyond projections 48 and through slots 54 in each of the support members 28. The purpose of this structure is to permit vertical movement of the element 46 with attached structure and to guide it during said movement.

Two sets screws 56 and 58 are provided. Set screw 56 is threaded in yoke 42 and projects downwardly therefrom. By controlling the distance travelled downwardly by the sleeve 44, set screw 56 controls the thickness of the deposited charge of gasket-forming material. Set screw 58 is threaded in support member 32 and extends downwardly through an opening in yoke 42 provided for that purpose. By regulating the extent of upward travel of element 46, set screw 58 controls the quantity of gasket-forming material which is permitted to enter a chamber 60, and which is thereafter subsequently applied to the closure surface, as will be more fully described below.

Figures 1, 3:
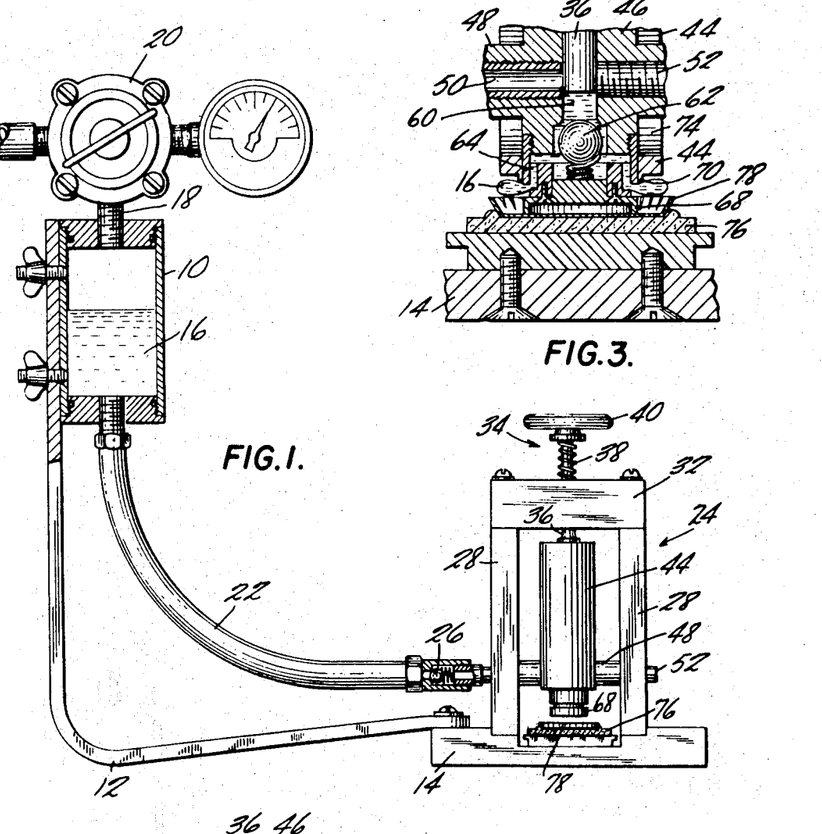
FIGURE 1 is a side view, partially in cross section, of the one form of an apparatus in accordance with this invention shown in use for providing an annular ring of foamable material in a crown closure.
FIGURE 3 is an enlarged fragmentary sectional view showing the discharge components of the dispenser of FIGURE 2 partway through their cycle of operation.
Figure 4:
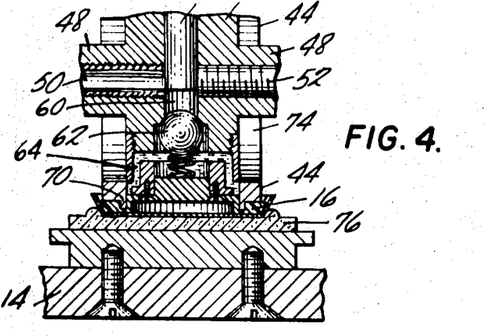
FIGURE 4 is another enlarged fragmentary sectional view showing the discharge components of the dispenser of FIGURE 2 in their relative position during the actual depositing portion of the operating cycle.
Figures 5, 6:
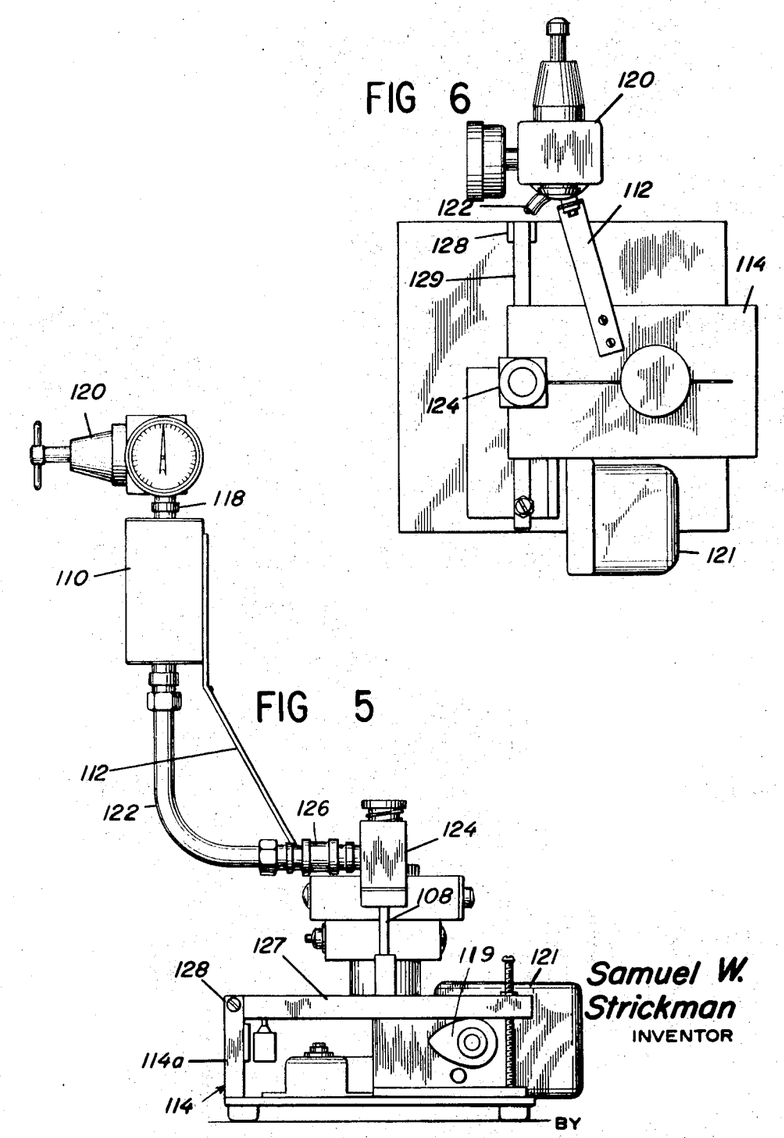
FIGURE 5 is a front elevational view of a dispensing device illustrative of another embodiment of the apparatus of the present invention showing the dispensing means disposed so as to provide the ring-shaped charge in an upward direction.
FIGURE 6 is a top plan view of the apparatus of FIGURE 5.
Figures 7, 8:
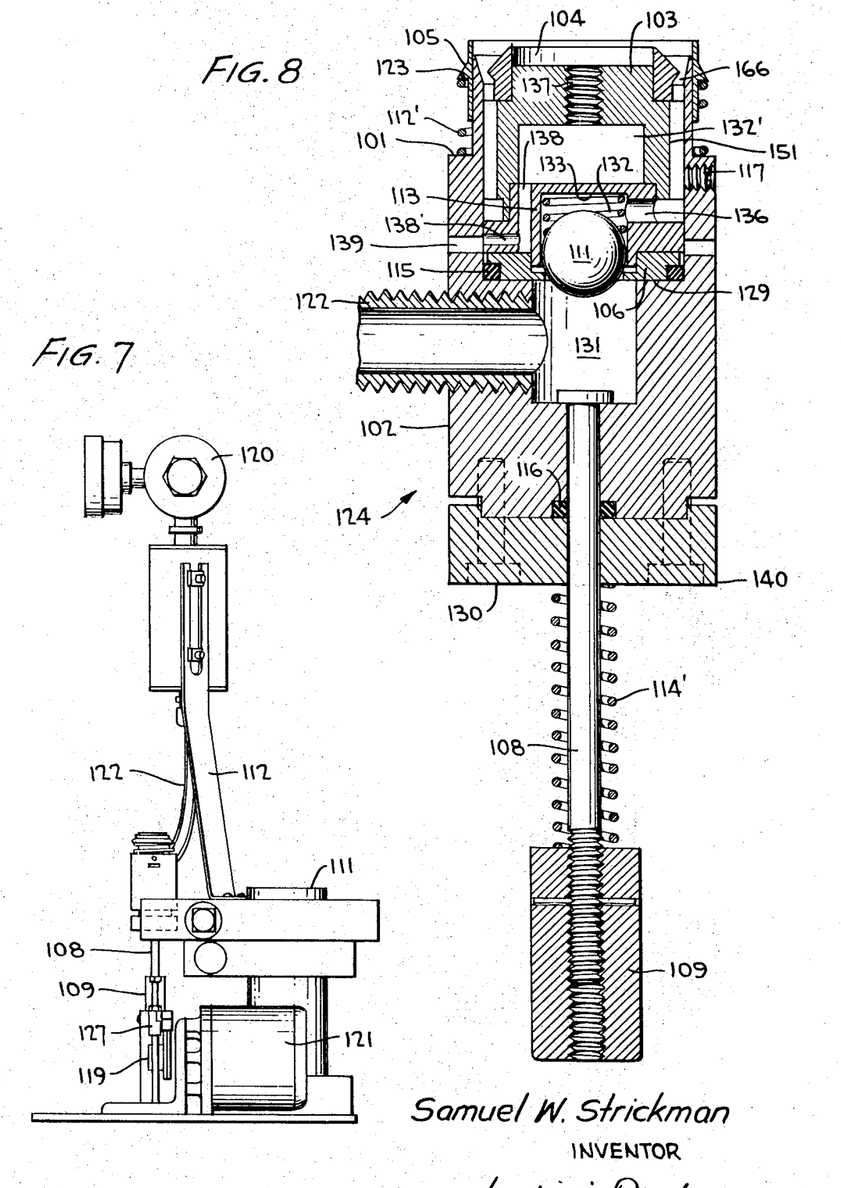
FIGURE 7 is a side elevational view of the apparatus of FIGURE 5 showing some of the details of construction.
FIGURE 8 is a fragmentary view of the dispensing device taken as shown by the line A—A of FIGURE 7.

Referring to the lower part of the dispensing device 24 shown in FIGURES 2, 3, and 4, a ball check valve 62 is seated in element 46 between chamber 60 and the exit passages 64. The exit passageways 64 comprise a series of radially-projecting bores which extend through the lower end of element 46. The exit passages 64 terminate on the exterior wall of element 46 in a peripheral orifice 66. The bottom of reciprocating element 46 forms a die at 68, said die 68 assuring positive contact with a closure surface when the gasket-forming material is being deposited. The die 68 also serves to confine the deposited material to the periphery of the closure surface. A projection 70 is provided at the lowermost point of sleeve 44 for the purpose of insuring a minimum thickness of the charge of gasket-forming material during the application thereof to a closure surface.

The valve 26 and the valve 62 can be of essentially the same construction, however, the pressure required to open valve 62 is greater than the pressure required to open valve 26. An adjustment in the compressive force of the valve springs provides this result which is necessary to ensure that pressure of material passing through inlet conduit 22 is sufficient to open valve 26, but not open valve 62.

A spring 72 is attached at one end to the upper surface of element 46 and at the other end to the lower facing surface of yoke 42 and is positioned about the shaft 36, intermediate the aforementioned elements. Spring 72 is shown in a substantially unstressed position in FIGURE 2. Movement of the yoke 42 toward element 46 compresses spring 72, while movement of yoke 42 away from element 46 expands the spring. The strength of spring 72 is controlled so that the downward movement of shaft 36 causes complementary downward movement of element 46 until further downward movement of element 46 is impeded by contact of the die 68 with a stationary object. The sleeve 44 is slottted at either side at 74 to permit vertical movement thereof relative to element 46 without interference with the projections 48.

A conveyor 76 is provided beneath the dispenser 34, the conveyor 76 being arranged to position a closure cap 78 directly beneath element 46 and its die 68. Movement of the conveyor 76 may be discontinuous and synchronized with the cyclic operation of the dispenser 34 by well-known means, so that a new closure is advanced into place with each operating cycle, and such an automated feeding arrangement may be used, if desired, in the additional embodiments described hereinafter.

In the operation of the apparatus of FIGURES 1–4 the viscous gasket-forming material 16 is placed under pressure by introducing compressed gas into the reservoir 10. The material is forced through the flexible conduit 22 and through the ball check valve 26, the latter being forced open by the pressure. The viscous material 16 enters the cavity 60 through conduit 50 during upward travel of the shaft 36 relative to element 46.

The dispensing operation of this form of the apparatus is best described by following one complete cycle of its operation. As the dispensing unit 24 begins its downward travel, the entire unit, including the yoke 42, the sleeve 44, the element 46, the projections 48, and all other attached structure are also moved downwardly, the downwardly directed force applied to yoke 42 being substantially directly transferred to element 46 through the spring 72. Conduit 50 and guide 52 are permitted to move vertically by the provision of slots 54 in the support members 28. Element 46 stops its downward travel when die 68 comes into contact with the inner surface of a closure, shown at 78 in FIGURES 2, 3, and 4. Continued downwardly directed pressure on the handle 40 of dispensing unit 34 causes downward movement of the shaft 36 and of the sleeve 44 relative to the element 46, the same permitted by compression of spring 72. This has two effects. In the first place, it compresses the material 16 in the cavity 60 causing the ball check valve 26 to close and the ball check valve 62 to open. The material 16 is then extruded through the passages 64 and through orifice 66 as a bead formation on the outer surface of element 46, as shown in FIGURE 3.

Secondly, further downward movement of sleeve 44 and shaft 36 causes sleeve 44 to shear the bead of material 16 from the orifice 66, move it downwardly, and deposit it in a substantially orbiculate configuration on the surface of the closure. Downward travel of sleeve 44 and shaft 36 is arrested by one of two alternative means. The first of these is the set screw 56, which is positioned so that contact of the lower end thereof with the top of element 46 prohibits further downward movement of the yoke 42 with the attached shaft 36 and sleeve 44. Alternatively, further downward movement of these elements is stopped by contact of projection 70 on the downward face of sleeve 44 with the upwardly facing surface of the closure cap. Projection 70 has the additional function of assuring that the deposited charge of gasket-forming material is of a uniform and minimum depth.

After the charge of gasket-forming material of substantially orbiculate configuration has been deposited, the elements of the dispensing unit 34 are returned to their former position by simply removing the downwardly directed force on handle 40. During the return portion of the cycle, cavity 60 is enlarged by the upward movement of shaft 36 relative to element 46. This action lessens the pressure against the ball check valves 26 and 62, causing valve 62 to close and valve 26 to open, thus permitting entry of additional gasket-forming material through the ball check valve 26 and the conduit 50.

Although the apparatus described is designed for manual operation, it is evident that the dispensing unit 34 may be automatically achieved by suitable rotating cam means and that the operation thereof can be synchronized with a rate of movement of closures on the conveyor 76 to permit continuous depositing of gasket-forming material on the closure claps, withdrawal of said caps, and advancing of new caps.

Referring now to FIGURES 5–8, a dispensing device illustrative of another embodiment of the present invention comprises a reservoir 110 adapted to contain a viscous gasket-forming substance supported by suitable supporting structure 112 on a base assembly 114. A conduit 118 leads from the reservoir 110 to a source of compressed gas (not shown). A valve 120 is located in conduit 118 to regulate the flow of compressed gas to the reservoir 110. If desired, the reservoir 110 can be provided with an automatic feed and level-maintaining device (not shown).

A conduit 122, preferably of metal, leads from the reservoir 110 to the dispensing device shown generally at 124. A pressure-sensitive ball check valve 126 is located in conduit 122, preferably adjacent the dispensing device 124. The ball check valve 126 may be of any well-known type adapted to open in response to pressure exerted thereon by material leaving the reservoir 110 and close in response to pressure exerted thereon by material in the dispensing device 124.

A means for transferring reciprocating vertical movement to plunger 108 is provided which includes an operating lever arm 127, pivotably attached to upright supporting base member 114a by means of pinion 128, and adapted to respond to raise and lower in response to the eccentric motion of cam 119 rotated by motor 121.

Figures 13, 14, 15, 16, 18:
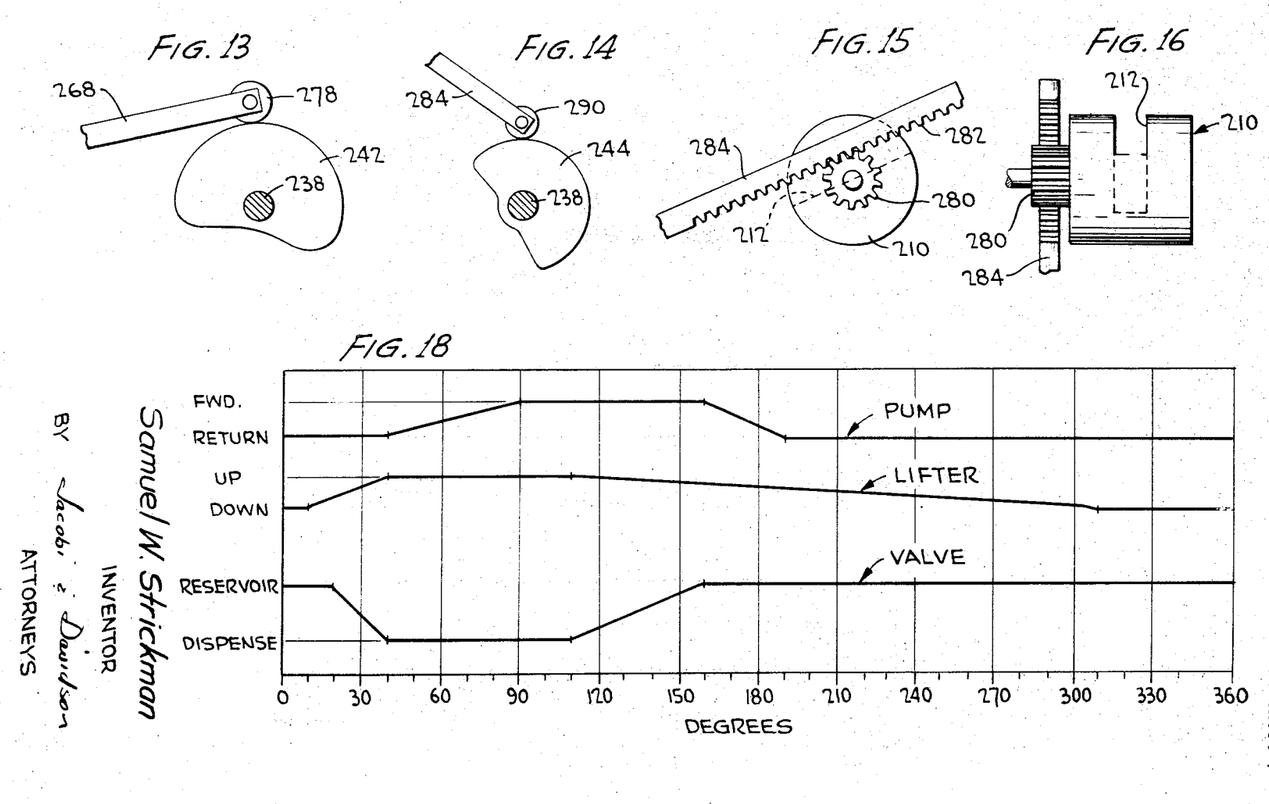
FIGURE 13 is a fragmentary elevational view of the camming mechanism for lifting the closure into gasket-receiving position in the apparatus of FIGURE 12.
FIGURE 14 is a fragmentary elevational view of the camming mechanism for operating the valve means to feed the material for forming the ring-shaped extrudate in the apparatus of FIGURE 12.
FIGURE 15 is a rear elevational view of the rack and pinion means actuated by the camming mechanism of FIGURE 14.
FIGURE 16 is a side elevational view of the valve of the apparatus of FIGURE 12.
FIGURE 18 is a diagrammatic graph of the camming operations during a full cycle of the apparatus of FIGURE 12.

Referring now to FIGURE 14, the dispensing head 124 includes an outer body member 102 rigidly supported by base assembly 114. Outer body member 102 is provided with a large axial bore which extends downwardly from the upper end thereof. The outer surface of the upper portion of outer body member 102 is reduced to provide a thinner annular or barrel shaped section upon which outer die member 105 is slidably mounted and biased upwardly by open helical coil spring 112 interposed around members 102 and 105 between the upper surface of annular shoulder or ledge 101 and the lower surface of annular flange 123 on element 105. Approximately midway down the length of body member 102, the axial bore is reduced to provide annular shoulder or ledge 129 adapted to seat member 106. A sealing gasket 115 is disposed between member 106 and the inner surface of the axial bore to provide a leak proof therebetween. Element 106 is provided with an aperture within which a ball type check valve 111 is mounted. The ball check valve is urged into engagement with the aperture of element 106 by coil spring 133 mounted within the cavity 132 of spring retainer cup 107. Spring retainer cup 107 is rigidly seated on member 106 by engagement with core element 103.

Core element 103 is disposed within the axial bore of member 102 by a plurality of vertically extending flutes defining vertically extending, radially spaced, passageways 151. Spreader and die member 104 is carried by core element 103. The inner surface of element 103 and the outer upper surface of member 107 form cavity 132'. Passageways 151 are in communication with a peripheral annular orifice 166 on the face of the dispensing head. The flutes forming the passageways 151 may be frictionally fit within the outer body member 103 to secure the elements in related assembly. Additionally a set screw 117 can be used to maintain the engagement.

Threaded bore 137 can be secured to a puller member (not shown) for disassembly of the elements.

Outer body member 102 is further adapted at the end opposite the peripheral annular shaped outlet to receive reciprocatory plunger 108 which is journalled for vertical, reciprocal movement through the lower end portion of outer member 102, gasket 116 and cap 140. Cap 140 is secured to body member 102 by appropriate bolts 130.

The heat foamable plastisol placed under pressure by the introduction of compressed gas into reservoir 110 is forced through conduit 122 and ball check valve 126 and into cavity 131 as plunger 108, shown biased in a most downward position by means of coil spring 114' which surrounds plunger 108 interposed between the top surface of end cap 109 and the bottom surface of cap 140, is retracted.

As plunger 108 continues its reciprocating movement and moves upwardly, it compresses the foamable plastisol within chamber 131 causing ball check valve 126 to close and ball 111 to move upward and compress spring 133 allowing the plastisol to enter chamber 132 via the aperture in member 106. Chamber 132, formed by the valve spring retainer cup, is in communication with passageways 151 by a series of radially projecting bores 136 extending through the wall of valve spring retainer cup 107 and terminating in the passageways 151. As plunger 108 continues its reciprocating movement through another cycle, a subsequent amount of plastisol is forced into passageways 151 which in turn forces an equal amount of the plastisol into and overflowing annular shaped orifice 166 to form a continuous substantially uniform annular shaped bead.

Element 105 which is slidably mounted about the upper end of element 102 and element 104 cooperatively form a die which assures confining the extrudate to a predetermined area of the closure surface when the gasket forming material is being deposited thereon. As the cap blank is brought into register with the dispensing head, initial contact is made between element 105 and the depending skirt of the closure blank immediately adjacent the cornice or top panel. Increased pressure of the cap blank upon element 105 causes element 105 to slide downward on outer body member 102. The resulting compression on spring 112' assures contact of the uppermost edge of element 105 with the inner surface of the closure blank sufficient to uniformly confine the plastisol extrudate. As element 105 slides downward in response to continuing pressure on the blank, die member 104 is brought into proximity with the inner surface of the top panel sufficient to uniformly confine the extrudate. Substantially simultaneously therewith, a quantity of foamable plastisol is forced to overflow the annular shaped orifice 166 and to be distributed substantially uniformly within the cavity making contact within the inner surface of the closure cap blank defined by elements 104 and 105.

The quantity of plastisol extruded from the annular shaped outlet, perforce the thickness, width and general shape of the extrudate deposited within the cup shaped shell, is cooperatively determined by the compressive force of valve spring 133, the length of the stroke of plunger 108 and the compressive force upon coil spring 112', i.e., the distance outer die element 105 is exposed above the terminal edge of the tubular extension of body member 102. The compressive force upon coil spring 112' is determined by the pressure which the crown closure cap, i.e., the means by which the cap is placed over the outlet of the discharge device, exerts on outer die member 105.

In disengaging the closure cap blank from the dispensing head, the distance between inner die element 104 and the inner surface of the top panel of the cap increases and the foamable plastisol has a tendency to "tear away" from the mass and contact with the closure cap due to a partial vacuum arising within the cavity formed by the inner surface of the cap blank, the deposited charge of foamable plastisol and the upper surface of the dispensing head with concomitant lack of uniformity and imperfections in the deposited ring of plastisol. To counter the "tearing away" arising from the formation of the partial vacuum, the cavity formed by the inner surface of the cap blank, the deposited charge of foamable plastisol and the upper surface of the dispensing head is subjected to pressure sufficient to prevent formation of the partial vacuum therein. In general, the partial vacuum is prevented by exposing the cavity to atmospheric pressure via a passageway which includes the threaded bore 137 extending from the upper surface of core element 103 to the upper inner surface of axial bore cavity 132', a number of extending bores 138 which project axially through the wall of valve spring retaining cup 107 from the inner surface of cavity 132' and communicate with a comparative number of radially projecting bores 139 in outer body member 102 by radial passageways 138', the bores 139 terminating at the exterior surface of outer body member 102. Alternatively, a positive pressure, in contrast to mere venting to atmospheric pressure, may be supplied to this cavity through the same or other passageway means, e.g., by connecting a source of air under pressure (not shown) to bore 137. This feature becomes particularly important when the material has a high surface tension and the curtain being formed is therefore difficult to break when the closure is separated.

As disengaging of the crown closure blank from the dispensing device continues interplay between the adhesive forces of the plastisol and the inner surface of the closure cap, the adhesive forces between the plastisol and the die members and the cohesive force of the plastisol components produces a slight uniformly outward and downward pull upon the deposited plastisol ring resulting in a charge of heat foamable plastisol of uniformly continuous, substantially orbiculate configuration positioned so that subjecting the cap with the deposited mass to temperatures sufficient to actuate the foaming agent produces a cured cellular sealing surface or gasket taking the form in cross section of a quadrant having its arcuate surface extending between the top panel and the depending skirt having a major portion of the foam adapted to surround the outside edge of a container mouth and only a flattened edge portion of the foam in sealing engagement with the top sealing edge of the container mouth, such arrangement being particularly desirable for crown-type caps.

The closure seal generally resulting from curing the charge of foamable plastisol deposited as above has excellent resealable properties and has a broad field of application. However, where the closure is of the crown type to be employed in closing containers having the content under substantial pressure, e.g. carbonated beverages, the cap blank with the foamable plastisol ring deposited as described above is preferably subjected to slow rotational motion and the rotating surface of the plastisol ring contacted with a skimming means having a concave arcuate contact surface extending between the top panel and the depending skirt of the closure blank for a period of time sufficient to dispose the annular shaped deposit into taking the form in cross section of a quadrant having its arcuate surface extending between the top panel and the depending skirt having a high degree of uniformity.

Figure 9:
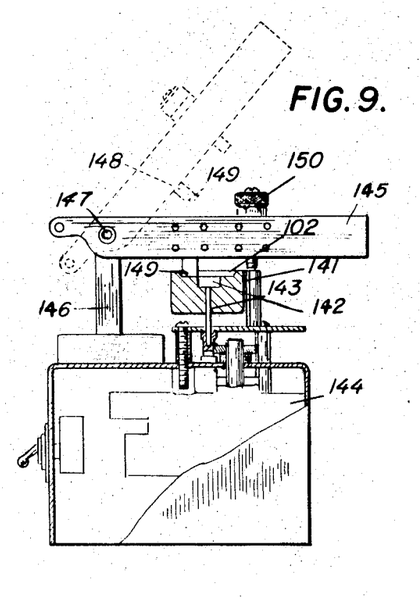
FIGURE 9 is an elevational view, partly diagrammatical, of an apparatus illustrative of an added embodiment of the apparatus of the present invention.
Figure 10:
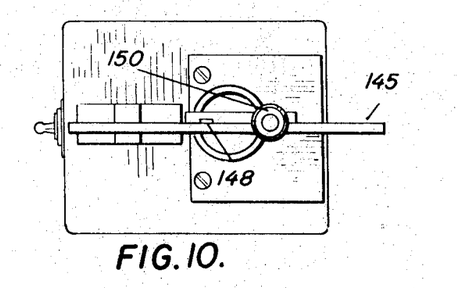
FIGURE 10 is a top plan view of the apparatus of FIGURE 9.
Figure 11:
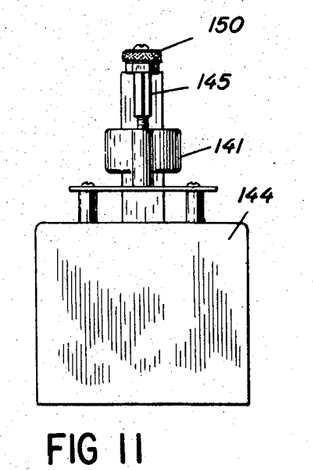
FIGURE 11 is a side elevational view of the apparatus of FIGURE 9.

The skimming operation is conveniently carried out by an additional embodiment of the present invention illustrated by FIGURES 9-11. Referring to these drawings and more particularly to FIGURE 9, the apparatus of this embodiment comprises a means for imparting rotational motion to the crown cap which includes matrix block 141 with a recess in the surface adapted to fit the outer conformation of the cap blank, and further recessed therein is a magnet 142 for holding the cap blank within the recess of the matrix block, drive shaft 143 adapted to be rotated by a speed reduction means and motor shown generally as 144. As the cap blank with the deposited annular shaped charge of foamable plastisol comes into register with the recess in the surface of the matrix block 141, lever arm 145, pivotably mounted to supporting upright member 146 by pinion 147 and holding the skimming tool 148 with the concave arcuate shape contact surface 149 is lowered so that the skimming contact surface comes in contact with the rotating surface of the plastisol ring. Lever arm 145 is further adapted to hold adjustment means 150 by which the pressure of the contact surface of element 148 upon the surface of the plastisol ring is adjusted.

In general, the cap blank is rotated at speeds sufficiently slow to prevent movement of or irregularities in the surface of the deposited plastisol by centrifugal force of rotation. The skimming tool contact surface is maintained in contact with the surface of the plastisol ring for a period of time to sweep the surface so as to provide a ring having uniform height, i.e., one to two seconds.

Although the aforementioned embodiments of FIGURES 5-8 and 9-11 have been described as individual components it is evident that the operation thereof can be synchronized with the rate of movement of the closure blanks to such components by suitable known means to permit continuous depositing of the gasket-forming material on the closure blanks, withdrawal of the blank and advancing the withdrawn blanks to the next required operational step, as is, also true with the structure of FIGURES 12-18.

Further, although the embodiment of FIGURES 5-8 have been shown as arranged for feeding the ring-shaped charge in an upwardly direction, a feature which is particularly desirable in laboratory operation and also in some commercial applications wherein it is important to be able to view the charge as it is dispensed, it will be readily recognized that the device may be reversed so that dispensing of the ring-shaped charge can take place in a downwardly direction such as in the embodiment of FIGURES 1-4.

Referring now particularly to FIGURES 12-18, a still further embodiment of the apparatus of the instant invention is shown wherein ring-shaped charges of foamable gasket-forming material or the like may be deposited in a fully automated and continuous manner. This device has been illustrated as particularly adapted for lining a screw-type closure with a ring of sealing material, although it will be understood that lug-type closures and crown-type caps can be readily utilized therewith. The overall apparatus is designated generally by the reference number 200 in FIGURE 12 and will be seen to include a reservoir 202 for the viscous gasket-forming material. Automatic filling and level-maintaining means may be included in the reservoir 202, if desired. Additionally, the reservoir may be maintained under pressure, although, since this embodiment does not utilize pressure-responsive check valves, it has been found that the force of gravity will be sufficient for proper dispensing therewith. The reservoir 202 is supported on a backing member 204 shown merely as illustrative for use in supporting the entire mechanism of this embodiment, although any desired supporting means may be substituted therefor.

The material within the reservoir 202 is connected by a conduit 206 to a valve head 208 having a valve member 210 rotatably supported therewithin. The valve member is shown in enlarged form in FIGURE 16 wherein it will be seen that it is provided with a cut-away slot 212 over approximately half of the member. The slot 212 may be disposed to provide communication between the reservoir 202 and the chamber of a pump 214 which is formed by a sleeve 216 having a piston 218 reciprocably carried in one end thereof. By rotating the valve member 210 in a manner to be described in more detail hereinafter, the slot 212 can be disposed to provide communication between the chamber of the pump 214 and a chamber 220 within a dispensing head 222, also to be described in more detail hereinafter.

A closure, illustratively shown as a screw-type closure 224 is placed on a closure support 226 slidably carried in a bracket 228 fixed to the member 204.

Lifting means 230, to be described in more detail hereinafter, are provided to raise the closure 224 into contact with the dispensing head 222 while valve operating means 232 and pump operating means 234, each to be described in more detail hereinafter, function to fill the pump from the reservoir 202 and then dispense a selected quantity of the gasket-forming material onto the closure 224 by rotating the valve member 210.

The entire mechanism is operated from a single motor shown schematically at 236, the drive shaft 238 of the motor 236 carrying and operatively rotating a pump cam member 240, a lifter cam member 242 and a valve-operating cam member 244.

Figure 12:
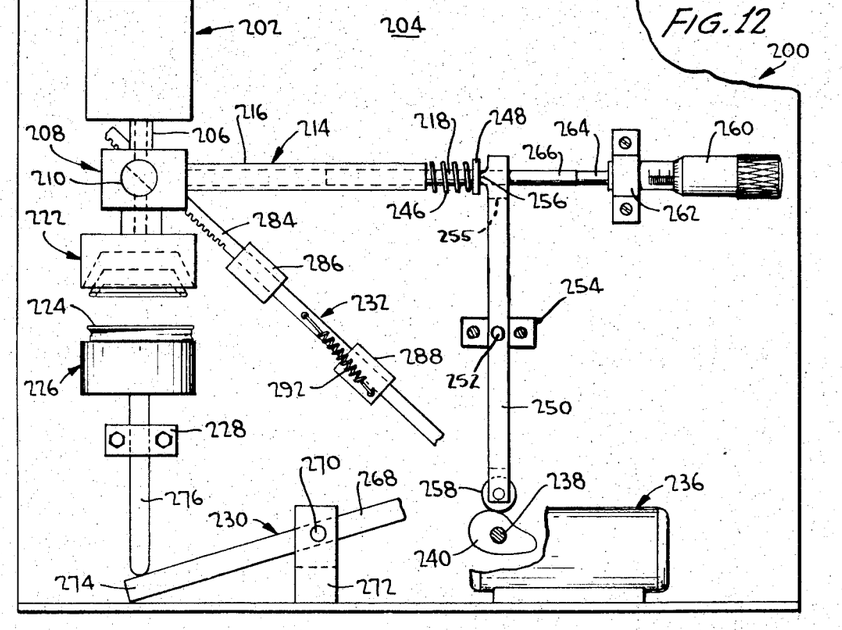
FIGURE 12 is a front elevational view of a still further and fully automated embodiment of the apparatus of the instant invention, various parts being broken away for illustrative clarity.

Describing first the operation of the pump means 214, it will be seen that the piston 218 is normally biased out of the cylinder or sleeve 216 by means of a spring 246 operating against a collar 248. The pump operating means 234 comprises an elongated arm 250 supported by a pivot pin 252 carried by a bracket 254 secured to the backing support 204. The upper end of the arm 250 is bifurcated as shown at 252 to straddle the piston 218 on the side opposite the collar 248. Collar engaging projections 256 may be provided on the bifurcated portion of the arm 250 with the opposite end of the arm 250 rotatably carrying a cam follower 258 operatively engaging the pump cam member 240 as shown in FIGURE 12. The pump cam member 240 is provided with a peripheral surface of such a shape as to pivot the arm 250 about the pin 252 and force the piston 218 into the chamber of the pump means 214 against the action of the spring 246 thereby feeding any material within the pump means 214 into the valve member 210 and, when the valve member is disposed properly, through the valve member and into the dispensing head 222. The spring 246 carries the piston 218 through the return portion of its stroke with the peripheral surface of the pump cam member 240 being arranged to permit such return.

According to a preferred feature of this embodiment of the invention the charge of material delivered from the pump means 214 to the dispensing head 222 may be varied by providing a variable limit on the extent of movement of the piston 218. This variable limit will be seen to be provided by a micrometer 260 carried by a bracket 262 secured to the backing support 204 and having an end portion 264 in engagement with the end portion 266 of the piston 218. By operating the micrometer 260 in a well-known manner the volume of the pump means 214 may be varied, the indicia on the micrometer 260 being readily correlated with the volume of the pump means so that desired changes in quantity of material dispensed can be accomplished in a quick and efficient manner.

The lifting means 230 include a lifting arm 268 pivotally supported at 270 by a bifurcated bracket 272. One end 274 of the lifting arm 268 underlies the rod 276 which carries the closure support 226 and which is slidably received in the bracket 228. The other end of the lifting arm 268 rotatably carries a cam follower 278 which is maintained in contact with the peripheral surface of the lifter cam member 242. The configuration of the peripheral surface of the lifter cam member 242 is so designed as to raise the closure 224 into contact with the dispensing head 222 at the desired portion of the operating cycle and then slowly withdraw the closure 224 from the dispensing head so as not to undesirably affect the annular ring deposited by suddenly breaking the curtain of material fed from the dispensing head onto the closure 224. This procedure will be described in more detail hereinafter with respect to FIGURE 18.

The valve member 210 is provided at its rear with a pinion 280 which will be seen in FIGURE 15. The pinion 280 is operatively engaged by a rack 282 carried by one end of the valve-operating arm 284. This valve-operating arm 284 is slidably supported in a pair of brackets 286, 288 secured to the backing support 204. At the end of the valve-operating arm 284 opposite to the rack 282 is a rotatably carried cam follower 290 which rides on the peripheral surface of the valve-operating cam member 244, a spring 292 being provided to maintain the follower 290 in operative engagement with the cam member 244. The peripheral surface of the valve-operating cam member 244 is so designed that the rack 282 will engage the pinion 280 and rotate the valve member 210 between its two operative positions wherein it will selectively provide communication between the pump means 214 and either the reservoir 202 or the dispensing head 222.

Figure 17:
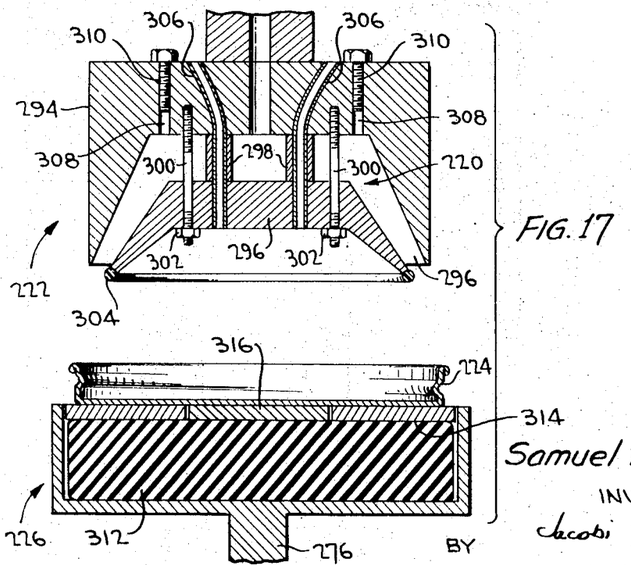
FIGURE 17 is a fragmentary vertical cross sectional view through the dispensing head and the closure support of the apparatus of FIGURE 12.

Details of the dispensing head 222 will be seen in FIGURE 17 wherein it will be noted that the chamber 220 is defined between an upper member 294 and a lower member 296. These members are maintained in spaced relationship in any suitable manner to provide an annular-spaced dispensing passageway 296. The illustrative embodiment shown in FIGURE 17 shows the proper spacing of these members to be effected by a pair of tubular spacing elements 298 and a pair of studs 300 secured to the upper member 294 and carrying nuts 302 beneath the lower member 296.

Since it has been found that the closure members may have significant variations in some of their dimensions, an annular sealing member formed of Teflon or the like 304 has been secured to the peripheral edge of the lower member 296 of the dispensing head 222. This Teflon ring actually engages the inside of the closure 224 in spaced relationship to the skirt of the same to define a limiting means for the flow of the material deposited thereon.

As has been mentioned previously there is some difficulty encountered by the vacuum caused between the dispensing head and the closure 224 and, for this reason, communication has been provided between the atmosphere and the central portion of the dispensing head. Such communication is provided in the embodiment shown in FIGURE 17 by a pair of tubes 306 forming passageways through the upper member 294, the spacers 298 and the lower member 296 to place the center of the closure 224 in communication with the atmosphere when the dispensing head is in operative engagement therewith. Preferably, however, the cavity between the dispensing head and the closure is subjected to a positive pressure either by feeding pressurized air into tubes 306 or in any other suitable manner.

Additionally, a pair of venting means 308 are provided to place the chamber 220 in communication with the atmosphere during the initial operation of the dispensing head to permit release of any air therewithin. Once the mechanism has been in operation, these openings can be sealed by the screws 310.

Details of the preferred construction of the closure support 226 are also shown in FIGURE 17 where it will be seen that a resilient member in the form of a rubber pad 312 carries the closure support plate 314 which has a central magnetic portion 316 for holding the closure 224 in position. The rubber pad 312 may be replaced by other suitable resilient means such as springs or the like and has been found to be advisable in commercial use due to the substantial variations between closures. This means in combination with the Teflon seal 304 will accommodate any such irregularities and insure optimum engagement between the dispensing head 222 and the closure 224.

Operation of the embodiment of FIGURES 12–17 will be best understood by reference to FIGURE 18 and by following one complete cycle of the mechanism. It will be understood that the cycle begins with the pump chamber full of gasket-forming material, that is, with the piston 216 in its return position. At this point the valve member 210 is disposed so that the slot 212 provides communication between the reservoir 202 and the pump 214 and the closure lift means 230 is in the down position. When the motor 236 is actuated to turn the motor shaft 238 and the cam members 240, 242 and 244 the following sequence occurs. The valve member 210 is rotated by the rack and pinion means 282, 280 to move the same so that the pump means 214 is in communication with the dispensing head 222. At the same time, the closure support 226 is raised by the lifting means 230 until the Teflon ring 304 engages the inside of the closure 224, the resilience of the Teflon and of the rubber pad 312 insuring good contact at this point. When the lifting means is raised completely and the valve is in position to feed to the dispensing head the pump actuating means 250 causes the piston 218 to move through its forward stroke and force the gasket-forming material from the pump into the chamber 220 in the dispensing head 222 and through the annular area 296 to form a ring on the closure 224 adjacent to, or in contact with, the skirt portion of the same, as desired by the particular needs of the operation. When the charge has been fully dispensed from the pump 214 the valve member 210 is returned to its reservoir-communicating position and the lifting means 230 starts a slow descent of the closure 224. After a portion of this slow withdrawal of the closure 224 the curtain of gasket-forming material formed between the dispensing head 222 and the closure 224 due to the interplay of adhesive and cohesive forces, is broken rather uniformly over the entire area of the charge. At this point, the lifter may be quickly dropped to its down position at which point it will receive a new closure and the gasketed closure will be removed for subsequent processing. When the valve member 210 has been fully rotated so that the pump means 214 is again in communication with the reservoir 202, the return stroke of the piston 218 is initiated to again fill the pump for the next cycle.

In the method of this invention, the crown shells, or other closure caps, may be prepared in the customary fashion by providing a sheet of steel or tin plate with lithographed matter on one face and with a coating of a vinyl resin lacquer on the other or inner face. A further coating of non-foamable plastisol over the lacquer may be for crown caps as will be seen from parent application Ser. No. 319,911. The charge of heat foamable plastisol is then applied by means of one of the dispensers of this invention, to the peripheral portion of the inner face of the closure, to allow for a seal about the edges of the mouth of the container. Following the application of the heat foamable plastisol the closure blank is subjected to proper temperatures to foam and fuse the gasket in situ.

It will now be seen that there is herein provided improved apparatus for dispensing annular extrudates which satisfy all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense.

What is claimed is:

1. Apparatus for depositing a ring-shaped extrudate of gasket-forming material to provide an annular seal in a container closure, said apparatus comprising a reservoir for the gasket-forming material, a dispensing head including portions defining a chamber for receiving the gasket-forming material from said reservoir, conduit means interconnecting said chamber with said reservoir, inlet valve means in said conduit means, means for selectively opening said inlet valve means and feeding gasket-forming material from said reservoir through said conduit means and into said chamber, further portions of said head defining an annular discharge opening in communication with said chamber for dispensing a ring-shaped extrudate from said head, an annular die element carried by said head forwardly and inwardly of said discharge opening for engaging the surface on which the extrudate is to be deposited to confine the extrudate to a predetermined portion of the same, an outlet valve means interposed between said chamber and said discharge opening, plunger means movable within said chamber to close said inlet valve means and to open said outlet valve means at the same time that it closes said inlet valve means, said inlet and outlet valve means being pressure responsive, said inlet valve means being responsive to a lesser pressure than said outlet valve means, means for feeding the gasket-forming material through said conduit means under a pressure great enough to open said inlet valve means but insufficient to open said outlet valve means, said plunger means reciprocably moving within said chamber to increase the pressure on the gasket-forming material therewithin sufficiently to open said outlet valve means, said inlet valve means including a one-way valve member disposed so that the increased pressure caused by said plunger means closes said inlet valve means.

2. The apparatus of claim 1 further including a core element downstream of said outlet valve means arranged to cause the gasket-forming material to flow around the outer perimeter thereof, said core element defining the inner portions of said discharge opening, and shearing means movable relative to said core element to engage the ring-shaped extrudate and to translate the same relative to said core element.

3. The apparatus of claim 2, wherein said shearing means includes spacing means to insure deposition of a charge of uniform and minimum thickness.

4. The apparatus of claim 2 wherein the closure includes a shell having a top panel and a peripheral skirt, said shearing means moving the ring-shaped extrudate into contact with the shell at the juncture of the top panel and the peripheral skirt so that the extrudate contacts both the top panel and the peripheral skirt in substantially orbiculate configuration.

5. Apparatus for depositing a ring-shaped extrudate of gasket-forming material to provide an annular seal in a container closure, said apparatus comprising a reservoir for the gasket-forming material, a dispensing head including portions defining a chamber for receiving the gasket-forming material from said reservoir, conduit means interconnecting said chamber with said reservoir, inlet valve means in said conduit means, means for selectively opening said inlet valve means and feeding gasket-forming material from said reservoir through said conduit means and into said chamber, further portions of said head defining an annular discharge opening in communication with said chamber for dispensing a ring-shaped extrudate from said head, an annular die element carried by said head forwardly and inwardly of said discharge opening for engaging the surface on which the extrudate is to be deposited to confine the extrudate to a predetermined portion of the same, a supporting means, said head being reciprocably carried by said supporting means and movable between a first position wherein said head is spaced from the surface on which the extrudate is to be deposited and a second position wherein said die element of said head is in engagement with the surface, guide means for limiting movement of said head between said two positions, said guide means including a slot defined by portions of said supporting means, and portions of said conduit means riding in said slot.

6. Apparatus for depositing a ring-shaped extrudate of gasket-forming material to provide an annular seal in a container closure, said apparatus comprising a reservoir for the gasket-forming material, a dispensing head including portions defining a chamber for receiving the gasket-forming material from said reservoir, conduit means interconnecting said chamber with said reservoir, inlet valve means in said conduit means, means for selectively opening said inlet valve means and feeding gasket-forming material from said reservoir through said conduit means and into said chamber, further portions of said head defining an annular discharge opening in communication with said chamber for dispensing a ring-shaped extrudate from said head, an annular die element carried by said head forwardly and inwardly of said discharge opening for engaging the surface on which the extrudate is to be deposited to confine the extrudate to a predetermined portion of the same, said die element being substantially cup-shaped, a cavity being defined between said die element and the surface on which the extrudate is to be deposited when said die element is in engagement with the surface, and passageway means connecting said cavity with a source of pressure sufficient to preclude formation of a vacuum therewithin.

7. The apparatus of claim 6 wherein means are provided for feeding pressurized air into said cavity.

8. The apparatus of claim 6 wherein said means are provided for communicating said cavity with the atmosphere to vent the same.

9. Apparatus for depositing a ring-shaped extrudate of gasket-forming material to provide an annular seal in a container closure, said apparatus comprising a reservoir for the gasket-forming material, a dispensing head including portions defining a chamber for receiving the gasket-forming material from said reservoir, conduit means interconnecting said chamber with said reservoir, inlet valve means in said conduit means, means for selectively opening said inlet valve means and feeding gasket-forming material from said reservoir through said conduit means and into said chamber, further portions of said head defining an annular discharge opening in communication with said chamber for dispensing a ring-shaped extrudate from said head, an annular die element carried by said head forwardly and inwardly of said discharge opening for engaging the surface on which the extrudate is to be deposited to confine the extrudate to a predetermined portion of the same, said die element including a flexible surface-engaging lip to provide proper sealing of said die element against the surface on which the extrudate is to be deposited even in the event of slight irregularities in the surface.

10. Apparatus for depositing a ring-shaped extrudate of gasket-forming material to provide an annular seal in a container closure, said apparatus comprising a reservoir for the gasket-forming material, a dispensing head including portions defining a chamber for receiving the gasket-forming material from said reservoir, conduit means interconnecting said chamber with said reservoir, inlet valve means in said conduit means, means for selectively opening said inlet valve means and feeding gasket-forming material from said reservoir through said conduit means and into said chamber, further portions of said head defining an annular discharge opening in communication with said chamber for dispensing a ring-shaped extrudate from said head, an annular die element carried by said head forwardly and inwardly of said discharge opening for engaging the surface on which the extrudate is to be deposited to confine the extrudate to a predetermined portion of the same, a closure-supporting means, said closure-supporting means including a closure-supporting member, deformable means underlying said closure-supporting member to floatingly carry said closure-supporting member and to provide proper sealing of said die element against the surface of the closure on which the extrudate is to be deposited even in the event of slight irregularities in the closure surface.

11. Apparatus for depositing a ring-shaped extrudate of gasket-forming material to provide an annular seal in a container closure, said apparatus comprising a reservoir for the gasket-forming material, a dispensing head including portions defining a chamber for receiving the gasket-forming material from said reservoir, conduit means interconnecting said chamber with said reservoir, inlet valve means in said conduit means, means for selectively opening said inlet valve means and feeding gasket-forming material from said reservoir through said conduit means and into said chamber, further portions of said head defining an annular discharge opening in communication with said chamber for dispensing a ring-shaped extrudate from said head, an annular die element carried by said head forwardly and inwardly of said discharge opening for engaging the surface on which the extrudate is to be deposited to confine the extrudate to a predetermined portion of the same, a pump means, said pump means including a cylinder and a piston defining a pump cavity therebetween, means for reciprocating said piston in said cylinder between a return stroke wherein the volume of said pump cavity is enlarged and a forward stroke wherein the volume of said pump cavity is reduced, said valve means including a valve member supported for rotation between a first position wherein said reservoir is placed in communication with said pump cavity and a second position wherein said pump cavity is placed in communication with said chamber, means for automatically disposing said valve member in said first position during said return stroke of said piston in said pump means whereby said pump cavity is filled with the gasket-forming material during said return stroke, and means for automatically disposing said valve member in said second position during said forward stroke of said piston in said pump means whereby the gasket-forming material is fed from said pump cavity to said chamber and through said discharge opening.

12. The apparatus of claim 11 further including a stop element engaging the end of said piston extending out of said cylinder to limit the travel of said piston on said return stroke, and means for varying the position of said stop element whereby the capacity of said pump cavity and thereby the charge of gasket-forming material may be varied.

13. The apparatus of claim 11 wherein said means for automatically disposing said valve member in said first and second positions includes a rack and pinion means operatively associated with said valve member for rotating the same, a valve-operating arm associated with said rack and pinion means at one end and carrying a valve cam follower at its opposite end, a valve-operating cam member having a peripheral surface operatively engaging said valve cam follower for moving said valve-operating arm and thereby rotating said valve member, a pump-operating arm operatively engaging said piston at one end and carrying a pump cam follower at its opposite end, a pump-operating cam member having a peripheral surface operatively engaging said pump cam follower for moving said pump-operating arm and thereby reciprocating said piston in said cylinder, and motor means operatively associated with said valve-operating cam member and said pump-operating cam member to synchronize operation of said valve member and said pump means.

14. Apparatus for depositing a ring-shaped extrudate of gasket-forming material to provide an annular seal in a container closure, said apparatus comprising a reservoir for the gasket-forming material, a dispensing head including portions defining a chamber for receiving the gasket-forming material from said reservoir, conduit means interconnecting said chamber with said reservoir, inlet valve means in said conduit means, means for selectively opening said inlet valve means and feeding gasket-forming material from said reservoir through said conduit means and into said chamber, further portions of said head defining an annular discharge opening in communication with said chamber for dispensing a ring-shaped extrudate from said head, an annular die element carried by said head forwardly and inwardly of said discharge opening for engaging the surface on which the extrudate is to be deposited to confine the extrudate to a predetermined portion of the same, a closure-supporting means, lifting means operatively associated with said closure-supporting means for automatically lifting a closure into engagement with said die element prior to discharging the extrudate from said head, said lifting means being lowered to withdraw the closure from engagement with said die member after deposition of the extrudate, cam means for raising and lowering said lifting means, said cam means being so designed and arranged as to relatively quickly raise said lifting means to engage a closure with said die element and relatively slowly lower said lifting means to withdraw the closure from said die element at least until the extrudate is completely separated from said head to preclude undesirably disturbing the extrudate during the withdrawal operation.

References Cited
UNITED STATES PATENTS

| | | | |
|---|---|---|---|
| 945,357 | 1/1910 | Wilzen | 18 |
| 1,738,612 | 12/1929 | Recht | 18 |
| 1,868,990 | 7/1932 | Peelle | 18 |
| 2,287,356 | 6/1942 | Newman | 18 |
| 2,419,951 | 5/1947 | Kasteel | 18 |

WILLIAM J. STEPHENSON, *Primary Examiner.*